(12) United States Patent
Wittenberg et al.

(10) Patent No.: US 10,313,220 B2
(45) Date of Patent: Jun. 4, 2019

(54) SYSTEM AND METHOD FOR EMITTER DETECTION

(71) Applicants: Peter S. Wittenberg, Creve Coeur, MO (US); Brian D. Cordill, Los Angeles, CA (US)

(72) Inventors: Peter S. Wittenberg, Creve Coeur, MO (US); Brian D. Cordill, Los Angeles, CA (US)

(73) Assignee: THE BOEING COMPANY, Chicago, IL (US)

( * ) Notice: Subject to any disclaimer, the term of this patent is extended or adjusted under 35 U.S.C. 154(b) by 290 days.

(21) Appl. No.: 15/212,792

(22) Filed: Jul. 18, 2016

(65) Prior Publication Data

US 2018/0017665 A1 Jan. 18, 2018

(51) Int. Cl.
*H04L 12/26* (2006.01)
*G01S 7/02* (2006.01)
*G01S 7/00* (2006.01)

(52) U.S. Cl.
CPC .............. *H04L 43/16* (2013.01); *G01S 7/021* (2013.01); *H04L 43/022* (2013.01)

(58) Field of Classification Search
CPC ........... G01S 7/2922; G01S 7/35; G01S 7/021
USPC .......................................................... 342/20
See application file for complete search history.

(56) References Cited

U.S. PATENT DOCUMENTS

| | | | | |
|---|---|---|---|---|
| 3,668,702 A * | 6/1972 | Jones | ..................... | G01S 7/2921 324/76.29 |
| 4,044,352 A * | 8/1977 | Wilmot | ................. | G01S 7/2922 342/159 |
| 4,173,017 A * | 10/1979 | Burlage | ................... | G01S 13/52 342/162 |
| 5,341,141 A * | 8/1994 | Frazier | .................. | G01S 7/2927 342/129 |
| 5,781,591 A * | 7/1998 | Wolf | ...................... | G01S 7/2922 375/340 |
| 6,002,723 A * | 12/1999 | Chethik | ................ | H04L 25/061 375/317 |
| 6,009,118 A * | 12/1999 | Tiemann | ............... | G01S 5/0027 375/150 |
| 6,738,436 B1 | 5/2004 | Harres | | |
| 7,403,144 B1 | 7/2008 | Cruz-Albrecht et al. | | |
| 7,760,131 B2 * | 7/2010 | Tyree | ...................... | G01S 13/42 342/83 |

(Continued)

FOREIGN PATENT DOCUMENTS

WO         2000 051246 A2     8/2000

OTHER PUBLICATIONS

M. I. Skolnik, "Introduction to Radar Systems," second edition; McGraw-Hill Book Company; New York, NY, USA; copyright year 1980; ISBN 0-07-057909-1; pp. 388-390. (Year: 1980).*

*Primary Examiner* — Bernarr E Gregory
(74) *Attorney, Agent, or Firm* — Toler Law Group, P.C.

(57) ABSTRACT

A signal receiver includes receive circuitry. The signal receiver further includes a processor coupled to the receive circuitry and configured to receive, from a filter, a stream of samples including a first set of samples. A data rate of an input of the filter may correspond to a data rate of an output of the filter. The first set of samples includes multiple samples. The processor is further configured to perform a detection operation on the first set of samples. The processor is further configured to detect a signal emitter based on the detection operation.

20 Claims, 6 Drawing Sheets

Legend
106a- Filter
106b- Filter
106c- Filter

(56) References Cited

U.S. PATENT DOCUMENTS

| | | |
|---|---|---|
| 7,822,698 B1 | 10/2010 | Cruz-Albrecht et al. |
| 7,929,647 B2 | 4/2011 | Johnson |
| 8,022,858 B2 * | 9/2011 | Wen et al. ............. G01S 7/021 |
| | | 342/20 |
| 8,566,265 B1 | 10/2013 | Cruz-Albrecht et al. |
| 8,959,040 B1 | 2/2015 | Cruz-Albrecht et al. |
| 8,977,578 B1 | 3/2015 | Cruz-Albrecht et al. |
| 9,488,720 B2 * | 11/2016 | Cornic et al. ............ G01S 7/35 |
| 9,664,778 B2 * | 5/2017 | Cornic et al. ............ G01S 7/35 |
| 2008/0094274 A1 * | 4/2008 | Nakanishi ................ G01S 7/36 |
| | | 342/91 |
| 2015/0048965 A1 * | 2/2015 | Cornic et al. ............ G01S 7/35 |

* cited by examiner

SYSTEM AND METHOD FOR EMITTER DETECTION

FIELD OF THE DISCLOSURE

The present disclosure relates to emitter detection.

BACKGROUND

Emitter detection schemes may be used to make a detection decision based on a single data point of an output of a filter (e.g., a correlation-type filter or matched-type filter. The single data point of the output of the filter may be generated by collecting multiple data points from the emitter and processing the multiple data points. A detector that makes a detection decision based on a single output data point of the filter may employ a relatively high signal to noise ratio (SNR) detection threshold in order to reduce the rate of false alarms. Use of a detector that uses a relatively high SNR detection threshold may limit detection range of a system that employs the detector.

SUMMARY

Emitter detection may be performed based on evaluating multiple output data points of a filter. In a particular implementation, an electronic warfare device includes a processor configured to determine whether at least a particular number of samples of a set of samples of a streaming output of a filter satisfy a threshold. A data rate of the streaming output of the filter corresponds to a data rate of an input to the filter. The processor is further configured to detect a signal emitter based on the determination.

In another particular implementation, a device includes a processor configured to receive, from a filter, a stream of samples including a first set of samples. A data rate of an input of the filter corresponds to a data rate of an output of the filter. The processor is configured to perform a detection operation on the first set of samples and the processor is further configured to detect a signal emitter based on the detection operation.

In another particular implementation, a method includes receiving, from a filter, a stream of samples including a first set of samples. A data rate at the input of the filter corresponds to a data rate at the output of the filter. The first set of samples includes multiple samples. The method further includes performing a detection operation on the first set of samples and detecting a signal emitter based on the detection operation.

The features, functions, and advantages described herein can be achieved independently in various embodiments or may be combined in yet other embodiments, further details of which are disclosed with reference to the following description and drawings.

DETAILED DESCRIPTION

Particular embodiments of the present disclosure are described below with reference to the drawings. In the description, common features are designated by common reference numbers throughout the drawings.

The figures and the following description illustrate specific exemplary embodiments. It will be appreciated that those skilled in the art will be able to devise various arrangements that, although not explicitly described or shown herein, embody the principles described herein and are included within the scope of the claims that follow this description. Furthermore, any examples described herein are intended to aid in understanding the principles of the disclosure and are to be construed as being without limitation. As a result, this disclosure is not limited to the specific embodiments or examples described below, but by the claims and their equivalents.

Figure 1:
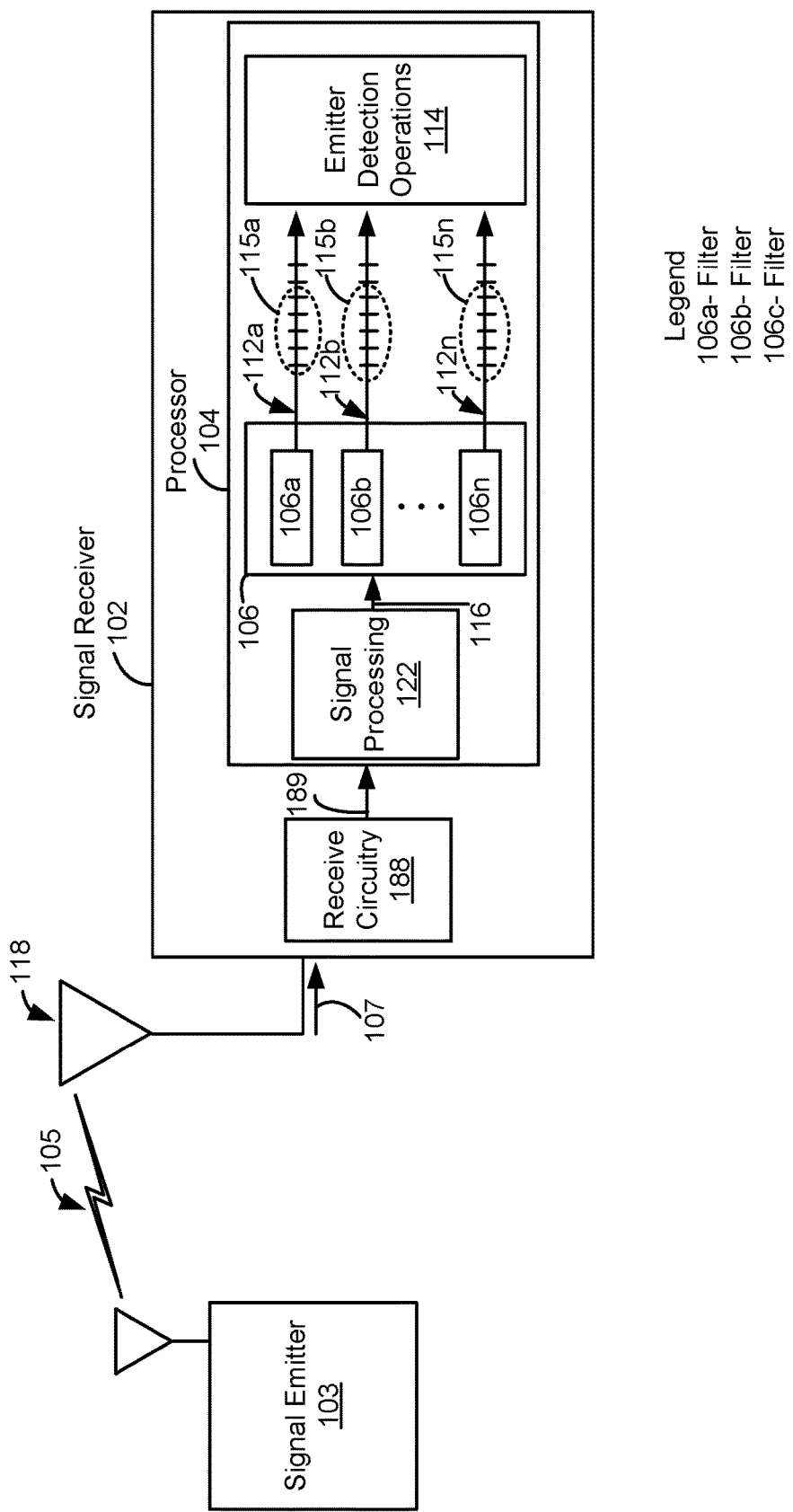
FIG. 1 illustrates a receiver including a processor configured to perform emitter detection operations.

FIG. 1 illustrates a signal receiver 102 including (or coupled to) receive circuitry 188 and a processor 104 configured to detect a signal emitter 103 based on a detection operation performed on samples of a streaming output of a filter 106. In some examples, the signal receiver 102, the processor 104, or both are included on a single integrated circuit (e.g., a single chip). The signal emitter 103 may be any device that generates and transmits an electromagnetic signal 105 incident on a transducer (e.g., an antenna 118) coupled to the signal receiver 102. For example, the signal emitter 103 may correspond to a low probability of intercept (LPI) radio detection and ranging (RADAR) transmitter and the electromagnetic signal 105 may correspond to an LPI signal. A signal 107 received at the receive circuitry 188 corresponds to a transduced version of electromagnetic energy incident at the antenna 118. A result of the detection operation may be indicative of whether the signal 107 received at the receive circuitry 188 is based at least in part on the electromagnetic signal 105. In some examples, the receive circuitry 188 includes an amplifier and/or an analog to digital (A/D) converter to process the signal 107 and provide a signal (e.g., a conditioned signal) 189 to the processor 104.

In some examples, the signal receiver 102 may correspond to an intercept receiver configured to detect emissions from non-cooperative signal emitters, such as emissions from non-cooperative LPI RADAR. Detecting the emissions from the non-cooperative signal emitters enables systems employing the signal receiver 102 to locate and/or effectively respond to the emissions from the non-cooperative signal emitters. For example, detection of emissions from non-cooperative LPI RADAR may enable a system to locate the non-cooperative LPI RADAR and identify parameters of the emissions from the LPI RADAR. Identifying parameters of emissions from the non-cooperative LPI RADAR may enable a system to generate a jamming signal configured to (e.g., having parameters, that when received by a receiver of the non-cooperative LPI RADAR) effectively interfere with the non-cooperative LPI RADAR's ability to process signal returns.

In some examples, the filter 106 may be configured to perform a correlation-type operation on a signal 116 input to the filter 106. In some examples, the filter 106 may correspond to an adaptive filter configured to perform a matching operation on the signal 107 or a signal derived therefrom (e.g., on the signal 116). In some examples, the filter 106 may include one of one or more filters 106a, 106b . . . 106n that may be synthesized to match or recognize a particular signal, thereby enabling the processor 104 to detect or recognize multiple signals or emitters based on the signal 107. Each of the one or more filters 106a, 106b . . . 106n may output a streaming output 112a, 112b . . . 112n, respectively. Each of the streaming outputs 112a, 112b . . . 112n may include a stream of samples. For example, the filter 106a may output a streaming output 112a including a set of N samples 115a (e.g., a first set of N samples), the filter 106b may output a streaming output 112b including a set of N samples 115b, and the filter 106n may output a streaming output 112n including a set of N samples 115n, where N is greater than one. In some examples, the first set of N samples 115a correspond to consecutive samples of the streaming output 112a, the set of N samples 115b correspond to consecutive samples of the streaming output 112b, and the set of N samples 115n correspond to consecutive samples of the streaming output 112n. The filter 106 may be streaming in the sense that the one or more filters 106a, 106b . . . 106n have an output data rate corresponding to (e.g., approximately equal to) a data rate of the signal 116 input to the filter 106. For example, the signal 116 input to the filter 106 may have a data rate of 20 gigahertz (GHz), and the streaming output 112a of the filter 106a may have a data rate of 20 GHz. Although the data rate of 20 GHz is used as an example, in other embodiments, the data rate of the input to the filter 106 (and thus the data rate of the output of the filter 106) may be greater than or less than 20 GHz. The receiver 102 also includes a signal processing device 122 which is described in more detail below.

The processor 104 is configured to perform signal processing operations 122 and emitter detection operations 114. The signal processing operations 122 may include denoising operations and/or source separation operations. The signal processing operations 122 produce, or result in, the signal 116 provided to the filter 106.

The emitter detection operations 114 may include performing (e.g., by the processor 104) a detection operation on one or more sets of N samples of one or more streaming outputs of the filter 106. For example, the emitter detection operations 114 may include performing a detection operation on each of the set of N samples 115a, the set of N samples 115b and the set of N samples 115n. The processor 104 is configured to perform the detection operation on a set of N samples in part by determining whether at least a particular number (M) of samples of the set of N samples satisfy a threshold T. For example, the processor 104 may perform the detection operation on the set of N samples 115a by determining whether at least the particular number (M) of samples of the set of N samples 115a satisfy the threshold T.

In some examples, the detection operation is performed on a set of N samples in part by comparing samples of the set of N samples to the threshold T and counting a number C of samples of the set of N samples that satisfy the threshold T (e.g., counting a number C of samples of the set of N samples that have a signal to noise ratio (SNR) that is greater than or equal to the threshold T). The result of the comparison for each sample may be referred to as an individual detection decision (e.g., a detection operation on a set of N samples may include making N individual detection decisions). An individual detection decision for a sample may indicate a preliminary emitter-detection (e.g., a "hit") when the sample satisfies (e.g., has a SNR that is greater than or equal to) the threshold T and may not indicate a hit when the sample does not satisfy (e.g., has a SNR that is less than or equal to) the threshold T. Thus, the detection operation performed on the first set of N samples 115a includes making an individual detection decision for each sample of the first set of N samples 115a and counting a number C of individual detection decisions for the first set of N samples 115a that indicate a hit.

Performing the detection operation on a set of N samples includes determining whether the counted number C of samples (for the set of N samples) that satisfy the threshold T is greater than or equal to the particular number M (e.g., by determining whether the counted number C of individual detection decisions for the set of N samples indicate a hit is greater than or equal to M). The processor 104 may be configured to detect the signal emitter 103 (e.g., declare a detection) based on a result of the detection operation. For example, the processor 104 may detect the signal emitter 103 based on the detection operation performed on the set of N samples when the detection operation indicates that the counted number C of samples of the set of N samples that satisfy the threshold T is greater than or equal to the particular number M.

To illustrate, the first set of N samples 115a may include 5 samples (e.g., N=5) and M may correspond to 2, and the detection operation may be performed on the first set of N samples 115a by comparing each sample of the first set of N samples 115a to the threshold T, counting the number of samples C of the N samples of the first set of N samples 115a that satisfy the threshold T, and determining whether the counted number C is greater than or equal to 2. In this example, the processor 104 may be configured to declare an emitter detection based on the detection operation performed on the first set of N samples 115a when a result of the detection operation indicates that the counted number C is greater than or equal to 2. Alternatively or additionally, the processor 104 may be configured not to declare a detection based on the detection operation performed on the first set of N samples 115a when a result of the detection operation indicates that the counted number is less than 2.

Thus, the emitter detection operations 114 may detect the signal emitter 103 based on a detection operation performed on a set of multiple samples (consecutive samples) of a streaming output of a filter. The detection operation performed on the set of multiple consecutive samples may include making individual detection decisions for the multiple consecutive samples of the streaming output. Using multiple individual detection decisions (made on multiple samples of a streaming output of a filter) to make an overall detection decision may enable use of a lower SNR threshold to detect a signal (and thus to detect an emitter of the signal) in the presence of noise at a given probability of false alarm as compared to schemes that make a detection decision based on a single output of a filter.

The threshold T may correspond to a signal to noise ratio (SNR). The thresholds T and M may be determined or set to achieve an overall probability of false alarm (PFA) for an overall detection decision (e.g., for a set of N samples) based on multiple individual detection decisions (e.g., based on N individual detection decisions). For example, an overall false alarm may occur when there are at least M false alarms from a set of N individual detection decisions. For a given value of M and N, the probability of false alarm ($PFA_T$) associated with each individual detection decision may be determined by treating each individual detection decision as a binomial sample having an associated $PFA_T$. For example, the $PFA_T$ may be related to the overall PFA according to Equation 1 (representing a function defined in MATLAB), where "binocdf" corresponds to a binomial cumulative distribution function, M corresponds to the particular numerical value (e.g., a first threshold), N corresponds to a quantity of samples of a set of N samples (e.g., a quantity of samples of the set of N samples 115) that are compared to the threshold T during a detection operation performed on the set of N samples.

$$PFA=\text{binocdf}(M-1,N,PFA_T)\quad\text{Equation 1}$$

Thus, a $PFA_T$ may be determined based on a given overall PFA. The threshold T may be determined based on the $PFA_T$ to achieve the given overall false alarm rate PFA. In some examples, M may correspond to a value that is less than half of the value of N. Because the signal receiver 102 uses multiple individual detection decisions based on a $PFA_T$, the overall PFA may be less than the $PFA_T$, which may enable a lower threshold T (e.g., a SNR) to be used for each individual detection decision than the threshold used to detect an emitter in systems that make a detection decision using a single output of a filter. Thus, the signal receiver 102 may be capable of using a lower SNR threshold to achieve a given overall PFA than systems that make an overall detection decision using a single output of a filter. The signal receiver 102 may therefore be able to detect the signal emitter 103 at a given overall PFA at an increased range between the signal receiver 102 and the signal emitter 103 than systems that make an overall detection decision using a single output of a filter.

Figure 2:
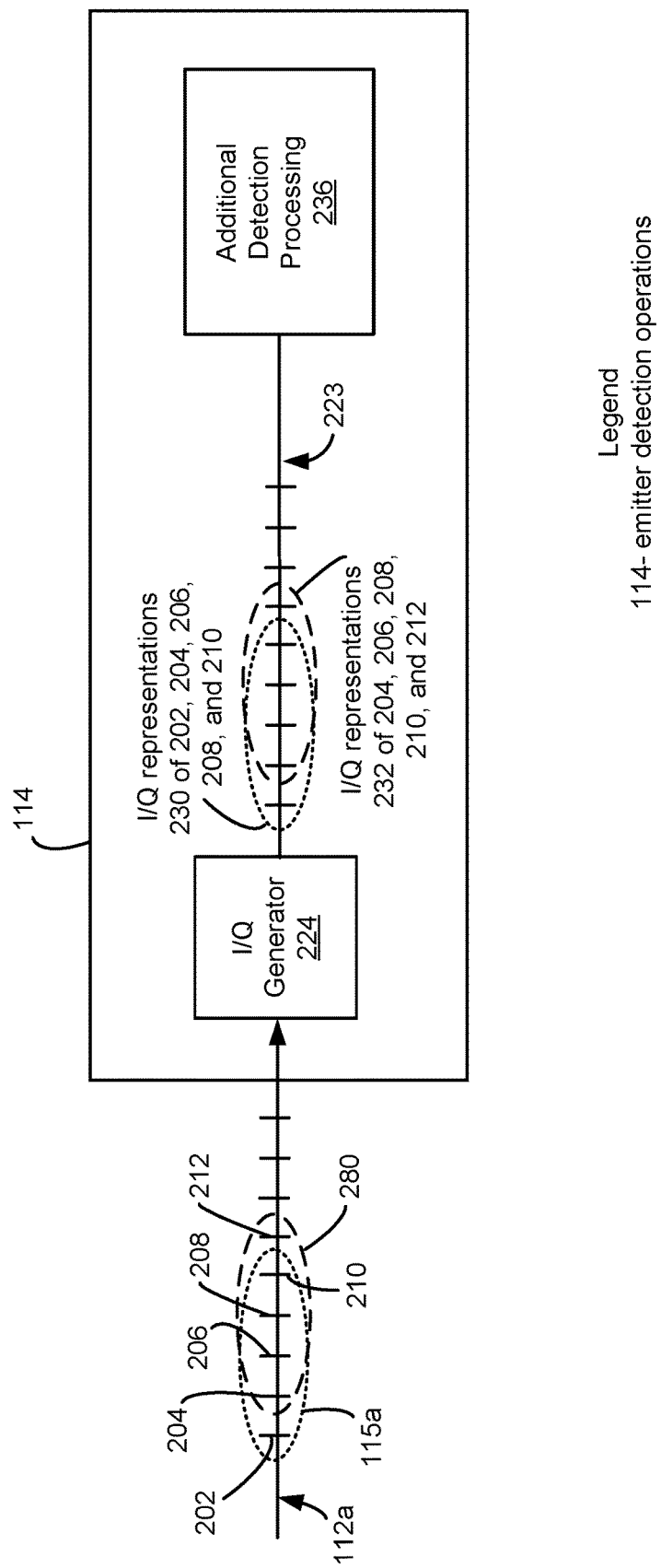
FIG. 2 illustrates an example of the emitter detection operations of FIG. 1.

FIG. 2 illustrates an example of the emitter detection operations 114 of FIG. 1 configured to receive a stream of samples (e.g., of the streaming output 112a of the filter 106a of FIG. 1) and to perform a detection operation on the first set of N samples 115a and/or a detection operation on a second set of N samples 280. The first set of N samples 115a and the second set of N samples 280 may each include consecutive samples of the streaming output 112a. Although the first set of N samples 115a and the second set of N samples 280 are illustrated as including 5 samples each, in other examples the value of N may be greater than or less than 5.

The emitter detection operations 114 of FIG. 2 may include (in-phase/quadrature) I/Q signal generation operations 224. The I/Q signal generation operations 224 may generate in-phase and quadrature (I/Q) representations 223 of the samples of the streaming output 112a. For example, the I/Q signal generation operations 224 include generating a first set of I/Q representations 230 of the samples 202, 204, 206, 208. The I/Q representations 223 may be provided to additional detection processing 236 of the emitter detection operations 114 for further processing, as described for example in FIG. 3.

In this example, the detection operation is performed (using the I/Q generation processing 224 and the additional detection processing 236) on the first set of N samples 115a by comparing each sample (202, 204, 206, 208, and 210) of the first set of N samples 115a to the threshold T (by comparing a magnitude of the I/Q representations 230 to the threshold T as described in more detail with reference to FIG. 3) and counting a number C of samples of the first set of N samples 115a that satisfy the threshold T. The detection operation performed on the first set of N samples 115a additionally includes determining whether the counted number C of the first set of N samples 115a that satisfy the threshold T is greater than M and making an overall detection decision for the first set of N samples 115a based on the determination.

Additionally or alternatively, the detection operation is performed (using the I/Q generation processing 224 and the additional detection processing 236) on the second set of N samples 280 by comparing each sample (204, 206, 208, 210, and 212) of the second set of N samples 280 to the threshold T (e.g., by comparing a magnitude of the I/Q representations 232 to the threshold T as described in more detail with reference to FIG. 3) and counting a number C of samples of the second set of N samples 280 that satisfy the threshold T. The detection operation performed on the second set of N samples 280 additionally includes determining whether the counted number C of the second set of N samples 280 that satisfy the threshold T is greater than M, and making an overall detection decision for the second set of N samples 280 based on the determination.

The signal receiver 102 may generate an indication of emitter detection based on detecting the signal emitter 103. For example, when a detection operation detects the signal emitter 103 based on the emitter detection operations 114 described above, the signal receiver 102 may generate a signal indicative of emitter detection. The signal indicative of emitter detection may be provided to a system configured to alert operators (e.g., of a vehicle) to the signal emitter 103 or to display a location of or an indication of the presence of the signal emitter 103 to the operators. Alternatively or additionally, the signal indicative of emitter detection may be provided to a remote processing facility to classify the signal emitter 103 or the electromagnetic signal 105 and record information about the signal emitter 103.

Figure 3:
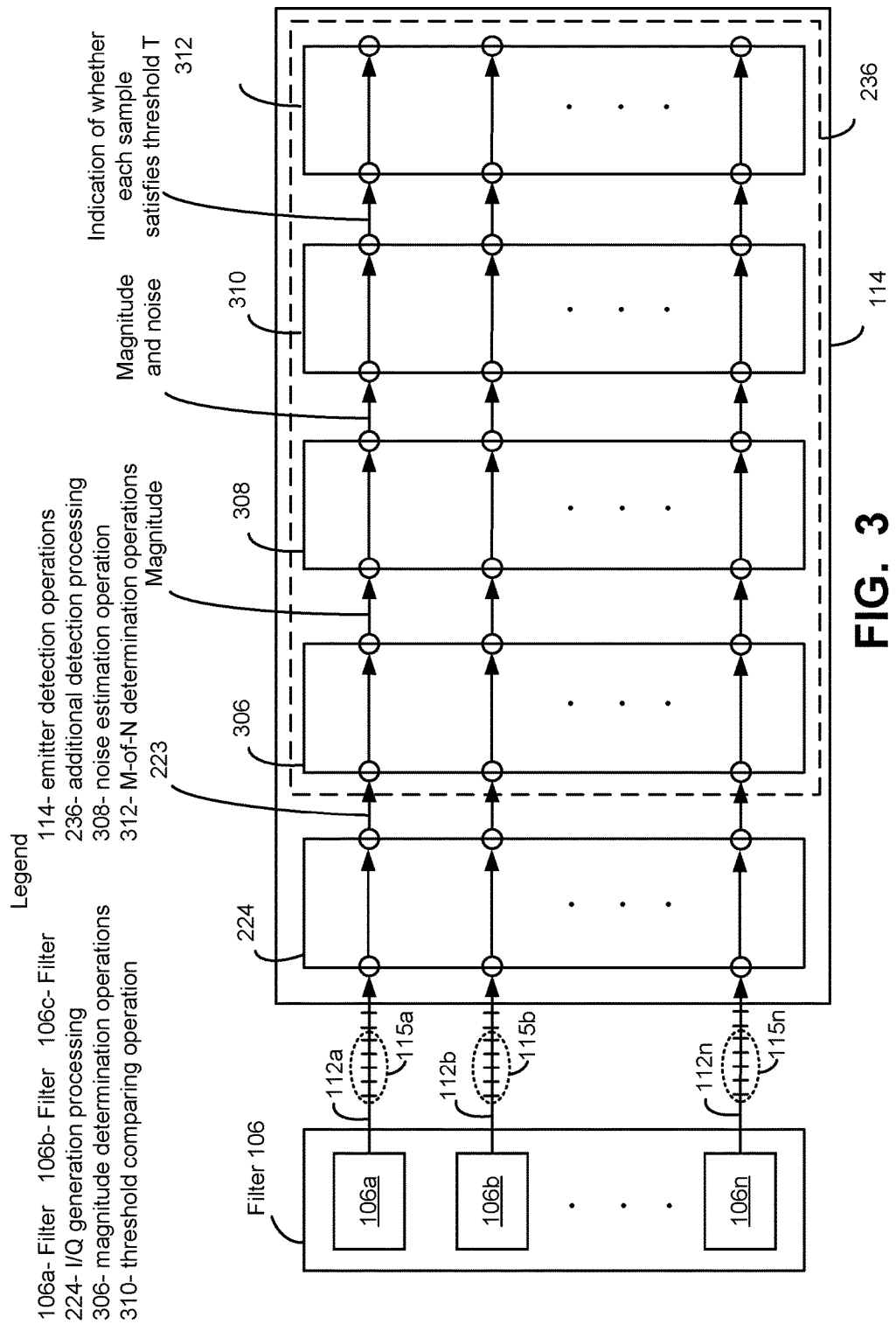
FIG. 3 illustrates an example of the emitter detection operations of FIG. 1.

FIG. 3 illustrates an example of the emitter detection operations 114 of FIG. 1 or FIG. 2. For example, the emitter detection operations 114 of FIG. 3 include performing a detection operation on each of the first set of N samples 115a and the second set of N samples 280 of FIG. 2.

The emitter detection operations 114 of FIG. 3 include I/Q signal generation operations 224 to generate I/Q representations of each sample output by the filter 106. For example, the I/Q signal generation operations 224 may generate or result in the I/Q representations 223 for the samples of the streaming output 112a as described above with reference to FIG. 2.

The emitter detection operations 114 of FIG. 3 additionally include a magnitude determination operation 306. The magnitude determination operation 306 determines a magnitude of the I/Q representations generated by performing the I/Q signal generation operations 224. For example, the magnitude detection operations 306 include determining a magnitude of the I/Q representations 223. In some examples, the magnitude determination operation 306 may include determining a magnitude of each I/Q representation of the I/Q representations 223 according to Equation 2, where I represents an in-phase component of an I/Q representation and Q represents a quadrature component of the I/Q representation.

$$\text{Magnitude}=\sqrt{I^2+Q^2}\quad\text{Equation 2}$$

The emitter detection operations 114 of FIG. 3 also include a noise estimation operation 308 to estimate a system noise level (e.g., of the signal receiver 102 of FIG. 1). In some examples, the estimated system noise level may be based on a thermal noise parameter (at an A/D converter) used to design an amplifier in the receive circuitry 188 of FIG. 1. Alternatively, the noise estimation operation 308 may estimate the system noise level using periodic calibration measurements of noise from the signal receiver 102 of FIG. 1 that are determined during times when there is no external stimulus for the signal receiver 102. The system noise level may be determined based on the most recent calibration measurement. Alternatively or additionally, the system noise level may be determined using order statistics.

The emitter detection operations 114 of FIG. 3 further include a threshold comparing operation 310 that includes determining a signal to noise ratio for each I/Q representation of the I/Q representations 223 and comparing the signal to noise ratio for each I/Q representation to the threshold T. The threshold comparing operation 310 includes determining the signal to noise ratio for an I/Q representation by determining a ratio of the magnitude determined for the I/Q representation by the magnitude determination operation 306 to the system noise determined by the noise estimation operation 308. For example, the threshold comparing operation 310 may determine a signal to noise ratio for an I/Q representation of the sample 202, a signal to noise ratio for an I/Q representation of the sample 204, a signal to noise ratio for an I/Q representation of the sample 206, a signal to noise ratio for an I/Q representation of the sample 208, and a signal to noise ratio for an I/Q representation of the sample 210. The threshold comparing operation 310 may be configured to compare the signal noise ratios for the samples 202, 204, 206, 208, and 210 to the threshold T, and to output an indication for each of the samples 202, 204, 206, 208, and 210 indicating whether the signal to noise ratio of the sample satisfies the threshold T. The output of the threshold comparing operation 310 may correspond to individual detection decisions described above with reference to FIG. 1.

The emitter detection operations 114 of FIG. 3 may include M-of-N determination operations 312. The M-of-N determination operations 312 may be configured to count, based on the indicators from the threshold comparing operation 310, a number C of samples of the last N samples that satisfy the threshold, and determining whether the count C for the last N samples satisfies a second threshold (e.g., is greater than or equal to M described above). Thus, the M-of-N determination operations 312 include operations to maintain a count of the number C for each set of running sets of the indicators (e.g., individual detection decisions) output by the threshold comparing operations 310 for the last N consecutive samples, and operations to compare the count of the number C for each set of the running sets of the indicators for the last N samples to M to determine whether the set of the last N consecutive samples satisfy the second threshold. The M-of-N determination operations 312 may include operations that generate, for each set of the running sets of the last N samples, an indication of whether the count C for the set of N samples satisfies the second threshold.

For example, the M-of-N determinations 312 may include operations that count a number C of the samples 202, 204, 206, 208, and 210 of the first set of N samples 115a that satisfy the threshold T based on the indicators (associated with the samples 202, 204, 206, 208, and 210) from the threshold comparing operations 310 and may generate an indication of whether the count of the number C of the samples 202, 204, 206, 208, and 210 of the first set of N samples 115a that satisfy the threshold T satisfies the second threshold. The M-of-N determination operations 312 may include operations that count a number C of the samples 204, 206, 208, 210, and 212 for the second set of N samples 280 and may generate an indication of whether the count of the number C of the samples 204, 206, 208, 210, and 212 of the second set of N samples 280 that satisfy the threshold T satisfies the second threshold.

To illustrate, the particular number M may correspond to 2. In this example, the M-of-N determination operations 312 may include operations that produces a first indicator indicative of an emitter-detection when the M-of-N determination operations 312 determine, based on the indicators from the threshold comparing operations 310, that at least two of the samples 202, 204, 206, 208, and 210 satisfy the threshold T. In this example, the M-of-N determination operations 312 may produce a second indicator indicative of a non-detection when the M-of-N determiner 312 determines, based on the indicators from the threshold comparing operations 310, that less than two of the samples 202, 204, 206, 208, and 210 satisfy the threshold T. Additionally or alternatively, in this example, the M-of-N determination operations 312 may produce the first indicator when the M-of-N determination operations 312 determine, based on the indicators from the threshold comparator 310, that at least two of the samples 204, 206, 208, 210, and 212 satisfy the threshold T, and may produce the second indicator when the M-of-N determination operations 312 determine, based on the indicators from the threshold comparing operations 310, that less than two of the samples 204, 206, 208, 210, and 212 satisfy the threshold T.

The emitter detection operations 114 of FIG. 3 may detect the signal emitter 103 (e.g., make an overall detection decision for a set of N samples) based on the indicator produced by the M-of-N determination operations 312. For example, the emitter detection operations 114 may detect the signal emitter 103 when the M-of-N determination operations 312 produce the first indicator. Thus, the emitter detection operations 114 may be configured to detect the signal emitter 103 based on a detection operation performed on one or more sets of samples of a streaming output of a filter, and the detection operation may include determining whether a count of a number C of samples of a set of N samples of a streaming output of a filter that satisfy a first threshold T satisfies a second threshold M.

Figure 4:
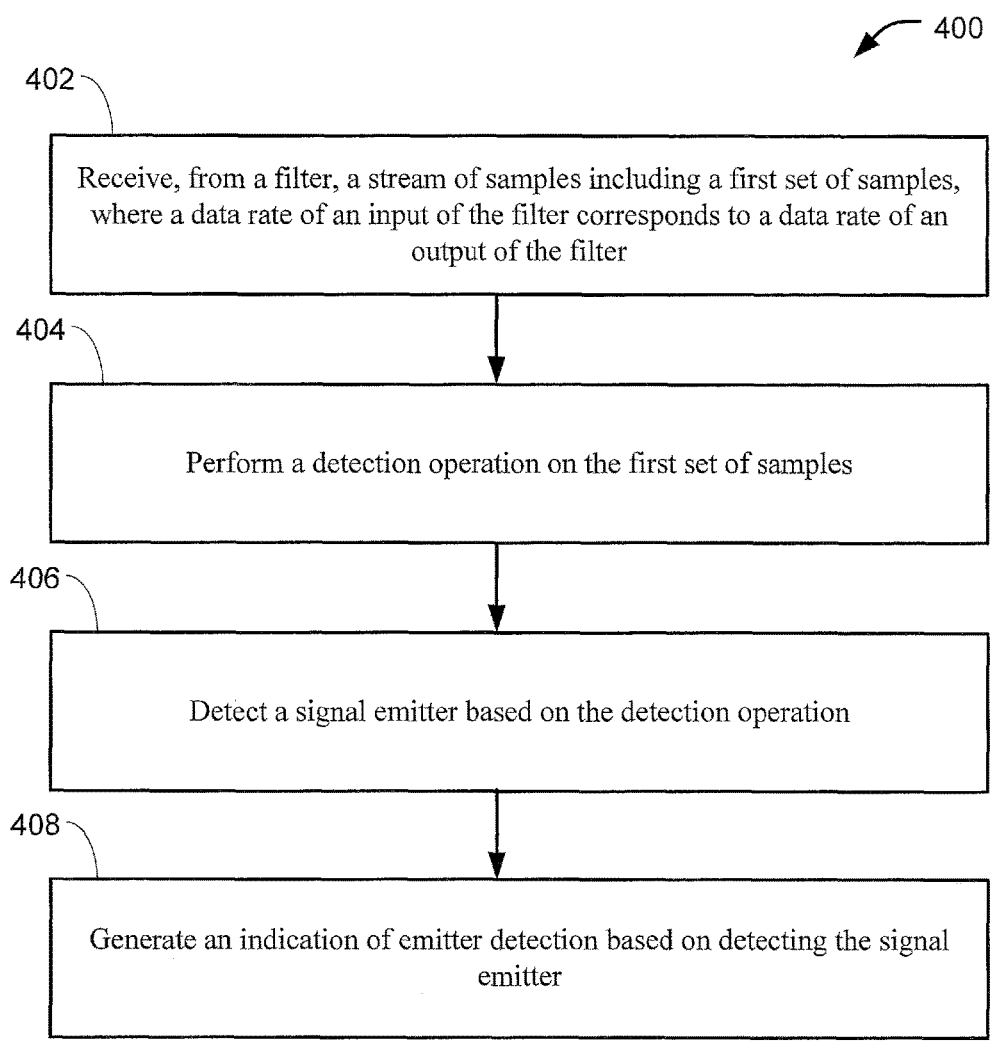
FIG. 4 is a flow chart of a particular example of a method of detecting a signal emitter.

FIG. 4 illustrates a method 400 of detecting an emitter. The method 400 of FIG. 4 may be performed by the processor 104 of FIG. 1. The method 400 of FIG. 4 may include, at 402, receiving, from a filter, a stream of samples including a first set of samples. A data rate of an input of the filter may correspond to a data rate of an output of the filter, and the first set of samples includes multiple samples. The filter may correspond to the filter 106 of FIG. 1, the stream of samples may correspond to the stream of samples 112a, 112b, or 112n of FIGS. 1, 2, and/or 3, and the first set of samples may correspond to the first set of N samples 115a of FIGS. 1-3.

The method 400 of FIG. 4 further includes, at 404, performing a detection operation on the first set of samples. For example, the detection operation may include comparing multiple samples of the first set of N samples to the threshold T and counting a number C of samples of the first set of N samples that satisfy the threshold T. To illustrate, the first set of N samples may correspond to the first set of N samples 115a of FIGS. 1-3.

The result of the comparison for each sample of the first set of N samples may be referred to as an individual detection decision, and the detection operation performed on the first set of N samples may include making an individual detection decision for each sample of the first set of N samples. An individual detection decision for a sample may indicate a hit when the sample satisfies the threshold T and may not indicate a hit when the sample does not satisfy the threshold T. Thus, the detection operation performed on the first set of N samples includes making an individual detection decision for each sample of the first set of N samples of the streaming output 112*a* and counting a number C of individual detection decisions for the first set of N samples that indicate a hit. The values of the threshold T, M, and N may be determined as described above with reference to FIG. 1.

The detection operation performed on the first set of N samples may further include determining whether the counted number C of samples (of the first set of N samples) that satisfy the threshold T is greater than or equal to the particular number M. In some examples, determining that the number C of individual detection decisions that indicate a hit is greater than or equal to the number M indicates that the signal 107 is based at least in part on the electromagnetic signal 105. Alternatively or additionally, determining that the number C of individual detection decisions (for a set of N samples) that indicate a hit is less than the number M indicates that the portion of the signal 107 corresponding to the first set of N samples is not based at least in part on the electromagnetic signal 105.

The method 400 of FIG. 4 further includes, at 406, detecting an emitter based on the detection operation performed on the first set of N samples. For example, the emitter detector may detect an emitter based on the detection operation performed on the first set of N samples based on whether the detection operation performed on the first set of N samples indicates that the counted number C of samples of the first set of N samples is greater than or equal to M. For example, the method 400 may include detecting (or indicating detection of) the emitter when the detection operation performed on the first set of N samples indicates that the counted number C of samples of the first set of N samples is greater than or equal to M, and may not detect (or may not indicate detection of) the emitter when the detection operation for the first set of N samples indicates that the counted number C of samples of the first set of N samples is less than M.

The method 400 of FIG. 4 may further include generating, at 408, an indication of signal emitter detection based on detecting the emitter. For example, the indication of the signal emitter may be provided to an alert or display system or to a remote processing center as described above with reference to FIG. 1.

Thus, the method 400 of FIG. 4 is utilized to detect a signal emitter based on a detection operation performed on a set of multiple samples of a streaming output of a filter. Using multiple individual detection decisions (made on multiple samples of an output of a filter) to make an overall detection decision may enable use of a lower SNR threshold to detect a signal (and thus an emitter of the signal) in the presence of noise at a given probability of false alarm as compared to schemes that make a detection decision based on a single output of a filter.

Figure 5:
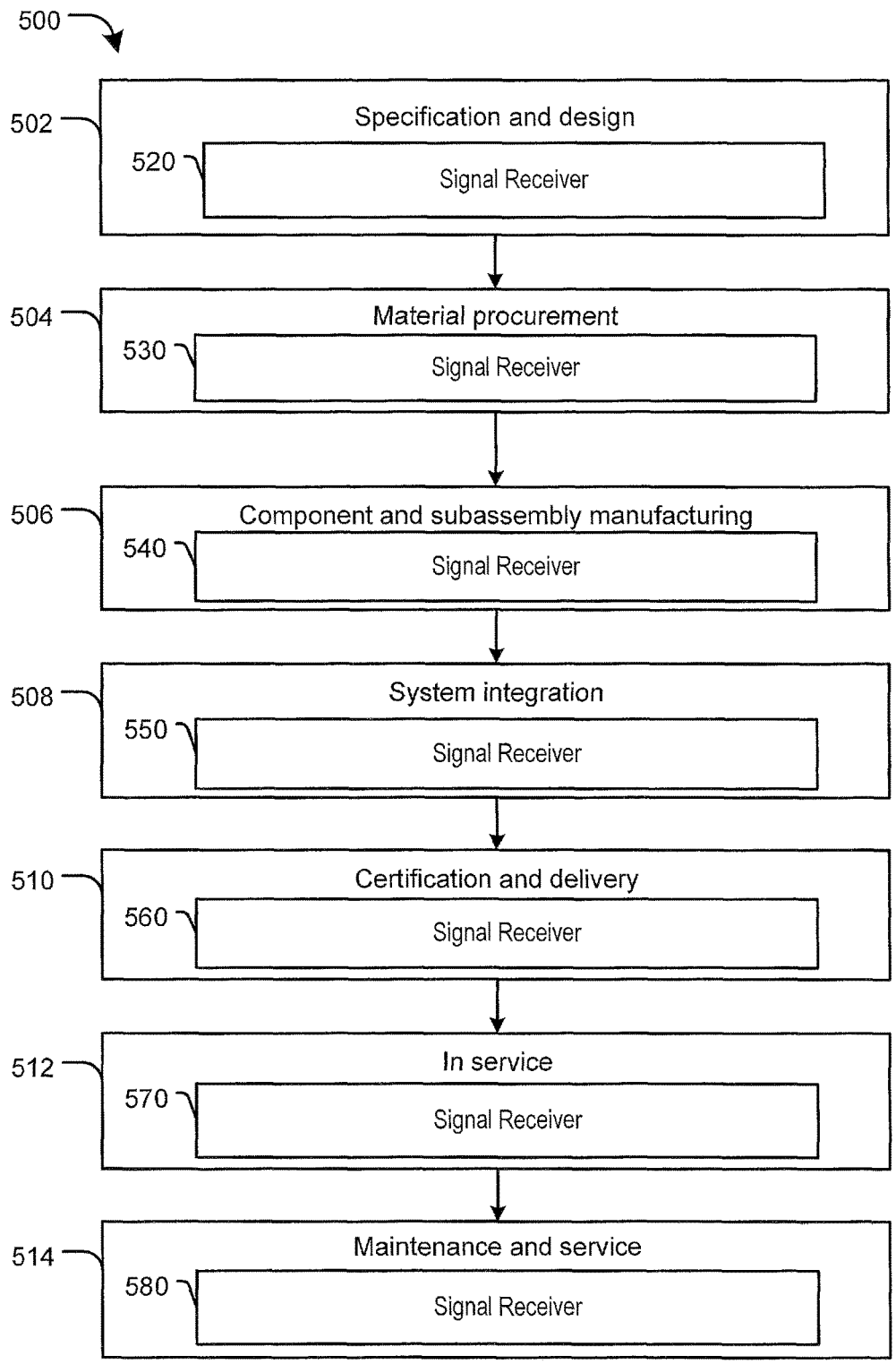
FIG. 5 is a flow chart illustrative of a life cycle of an aircraft that includes a processor configured to perform emitter detection operations.

Referring to FIG. 5, a flowchart illustrative of a life cycle of a vehicle (e.g., a land vehicle, an aerial vehicle, or a water vessel) or a fixed location platform including a signal receiver configured to perform emitter detection operations (e.g., the emitter detection operations 114 of FIGS. 1-3) to detect a signal emitter based on a detection operation performed on one or more sets of samples of a streaming output of a filter (e.g., the filter 106 of FIGS. 1-3) is shown and designated 500. As an example, the vehicle may correspond to a submarine.

During pre-production, the exemplary method 500 includes, at 502, specification and design of a fixed location platform or a vehicle, such as the aircraft 602 described with reference to FIG. 6 or a submarine. During specification and design of the vehicle or the fixed location platform, the method 500 may include, at 520, specification and design of the signal receiver. The signal receiver may include or may correspond to the signal receiver 102 FIG. 1. At 504, the method 500 includes material procurement. At 530, the method 500 includes procuring materials for the emitter detector.

During production, the method 500 includes, at 506, component and subassembly manufacturing and, at 508, system integration of the vehicle or the fixed location platform. The method 500 may include, at 540, component and subassembly manufacturing (e.g., producing the signal receiver) and, at 550, system integration of the signal receiver. At 510, the method 500 includes certification and delivery of the vehicle or the fixed location platform and, at 512, placing the vehicle or the fixed location platform in service. Certification and delivery may include, at 560, certifying the signal receiver (e.g., certifying the emitter detection operations of the signal receiver). At 570, the method 500 includes placing the signal receiver in service. While in service by a customer, the vehicle or the fixed location platform may be scheduled for routine maintenance and service (which may also include modification, reconfiguration, refurbishment, and so on). At 514, the method 500 includes performing maintenance and service on the vehicle or the fixed location platform. At 580, the method 500 includes performing maintenance and service of the signal receiver. For example, maintenance and service of the signal receiver may include replacing the processor 104 of FIG. 1.

Each of the processes of the method 500 may be performed or carried out by a system integrator, a third party, and/or an operator (e.g., a customer). For the purposes of this description, a system integrator may include without limitation any number of vehicle or fixed location platform manufacturers and major-system subcontractors; a third party may include without limitation any number of venders, subcontractors, and suppliers; and an operator may be an airline, leasing company, military entity, service organization, and so on.

Figure 6:
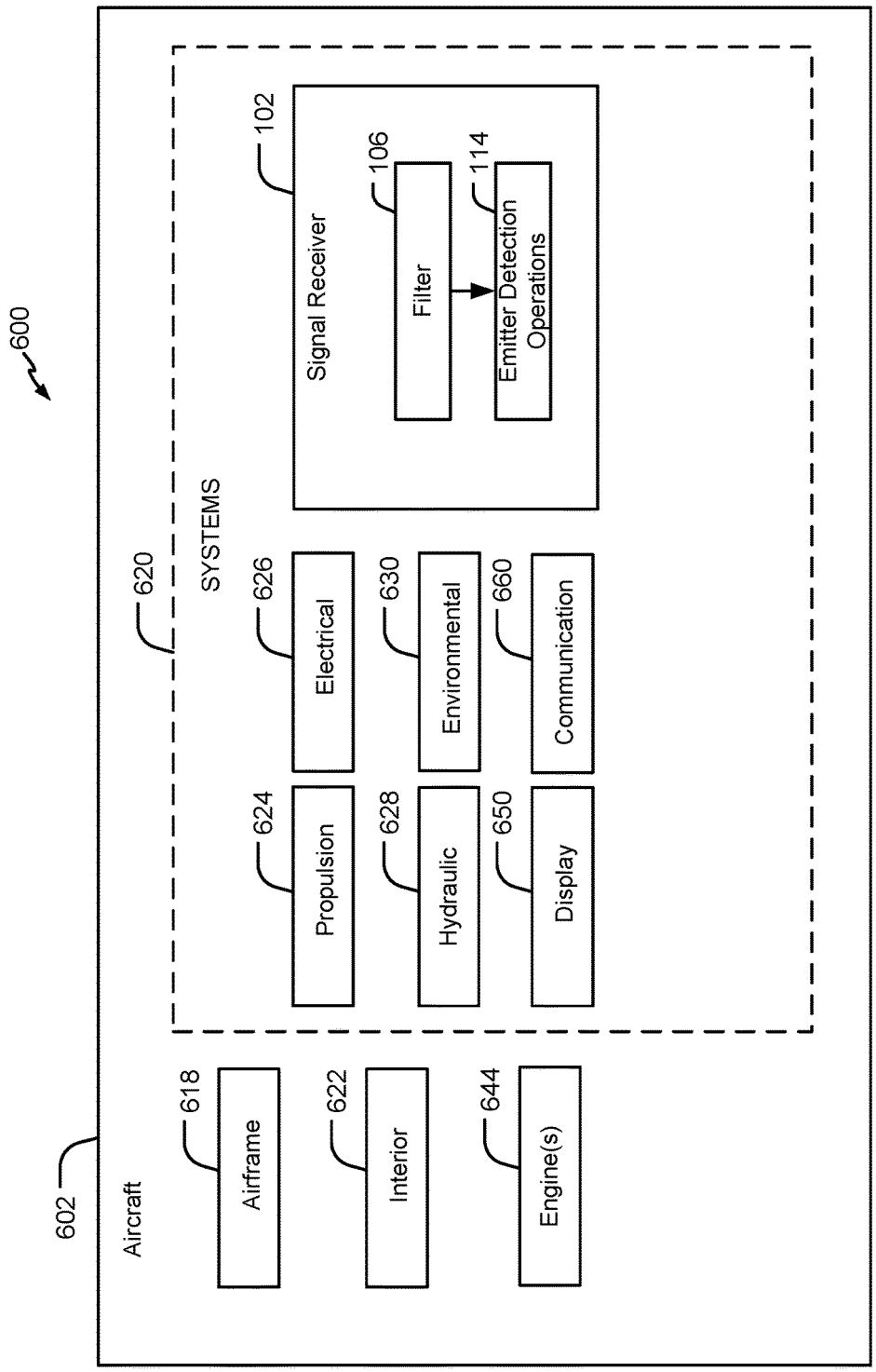
FIG. 6 is a block diagram of an illustrative embodiment of an aircraft that includes processor configured to perform emitter detection operations.

Referring to FIG. 6, a block diagram of an illustrative embodiment of an aircraft (e.g., an airplane or a drone) 602 that includes a signal receiver 102 configured to perform emitter detection operations 114 to detect a signal emitter based on a detection operation performed on a streaming output of a filter is shown and designated 600. As shown in FIG. 6, the aircraft 602 produced by the method 500 may include an airframe 618, an interior 622, one or more engines 644, and a plurality of systems 620 including a signal receiver 102. The systems 620 may additionally include one or more of a propulsion system 624, an electrical system 626, a hydraulic system 628, an environmental system 630, a display system 650, and a communication system 660. Any number of other systems may be included.

Apparatus and methods embodied herein may be employed during any one or more of the stages of the method 500. For example, components or subassemblies corresponding to production process 508 may be fabricated or manufactured in a manner similar to components or subassemblies produced while the aircraft 602 is in service, at 512 for example and without limitation. Also, one or more apparatus embodiments, method embodiments, or a combination thereof may be utilized during the production stages (e.g., elements 502-510 of the method 500), for example, by substantially expediting assembly of or reducing the cost of the aircraft 602. Similarly, one or more of apparatus embodiments, method embodiments, or a combination thereof may be utilized while the aircraft 602 is in service, at 512 for example and without limitation, to maintenance and service, at 514.

The illustrations of the examples described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. For example, method steps may be performed in a different order than shown in the figures or one or more method steps may be omitted. Accordingly, the disclosure and the figures are to be regarded as illustrative rather than restrictive.

Moreover, although specific examples have been illustrated and described herein, it should be appreciated that any subsequent arrangement designed to achieve the same or similar results may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. As the following claims reflect, the claimed subject matter may be directed to less than all of the features of any of the disclosed examples.

Examples described above illustrate but do not limit the disclosure. It should also be understood that numerous modifications and variations are possible in accordance with the principles of the present disclosure. Accordingly, the scope of the disclosure is defined by the following claims and their equivalents.

What is claimed is:

1. A signal receiver comprising:
    receive circuitry to receive a signal;
    a filter configured to generate sets of streaming output based on the signal, each set of streaming output comprising samples; and
    a processor coupled to the receive circuitry and configured to, for each set of streaming output:
        determine, based on in-phase and quadrature representations of each sample and an estimated system noise level of the receive circuitry, whether each sample satisfies a signal to noise threshold;
        detect a signal emitter based on at least a first number of samples in a particular number of consecutive samples satisfying the signal to noise threshold; and
        generate an indication of emitter detection based on detecting the signal emitter.

2. The signal receiver of claim 1, wherein the signal emitter corresponds to a device that generates and transmits an electromagnetic signal, and wherein detection of the signal emitter is indicative of whether a particular signal received at the receive circuitry is based at least in part on the electromagnetic signal.

3. The signal receiver of claim 1, wherein the signal emitter corresponds to a low probability of intercept (LPI) radio detection and ranging (RADAR) transmitter.

4. The signal receiver of claim 1, wherein the filter comprises an adaptive filter configured to perform a matching operation on the signal.

5. The signal receiver of claim 1, wherein the receive circuitry, the filter, and the processor are included on a single integrated circuit.

6. The signal receiver of claim 1, wherein the estimated system noise level is based on a thermal noise parameter associated with the receive circuitry.

7. The signal receiver of claim 1, wherein the estimated system noise level is based on a calibration measurement of noise from the receive circuitry without the receive circuitry receiving external stimulus.

8. A signal receiver comprising:
    receive circuitry to receive a signal;
    a filter configured to generate sets of streaming output based on the signal, each set of streaming output comprising samples; and
    a processor coupled to the receive circuitry and configured to, for each set of streaming output:
        determine whether a signal to noise ratio for each sample satisfies a signal to noise threshold, the signal to noise ratio based on a magnitude of an in-phase and quadrature representation of each sample and based on an estimated system noise level of the receive circuitry; and
        detect a signal emitter based on at least a first number of samples in a particular number of consecutive samples satisfying the signal to noise threshold; and
        generate an indication of emitter detection based on detecting the signal emitter.

9. The signal receiver of claim 8, wherein the signal emitter corresponds to a device that generates and transmits an electromagnetic signal, and wherein detection of the signal emitter is indicative of whether a particular signal received by the receive circuitry is based at least in part on the electromagnetic signal.

10. The signal receiver of claim 8, wherein the signal emitter corresponds to a low probability of intercept (LPI) radio detection and ranging (RADAR) transmitter.

11. The signal receiver of claim 8, wherein the first number is less than half of the particular number.

12. The signal receiver of claim 8, wherein the receive circuitry, the filter, and the processor are included on a single integrated circuit.

13. The signal receiver of claim 8, wherein the estimated system noise level is based on a thermal noise parameter associated with the receive circuitry.

14. The signal receiver of claim 8, further comprising an antenna coupled to the receive circuitry.

15. A method comprising:
    receiving, at a processor from a filter, sets of streaming output, each set of streaming output comprising samples; and
    for each set of samples:
        determining, at the processor, whether each sample satisfies a signal to noise threshold based on in-phase and quadrature representations of each sample and an estimated system noise level;
        detecting, at the processor, a signal emitter based on at least a first number of samples in a particular number of consecutive samples satisfying the signal to noise threshold; and generating, at the processor, an indication of emitter detection based on detecting the signal emitter.

16. The method of claim 15, wherein the signal emitter corresponds to a device that generates and transmits an electromagnetic signal.

17. The method of claim 16, wherein the signal emitter corresponds to a low probability of intercept (LPI) radio detection and ranging (RADAR) transmitter.

18. The method of claim 15, wherein the estimated system noise level is based on a thermal noise parameter associated with receive circuitry that provides a signal to the filter, wherein the filter generates the sets of streaming output based on the signal.

19. The method of claim 15, further comprising sending the indication to at least one of an alert system, a display system, and a remote processing center.

20. The method of claim 19, wherein the first number is less than half of the particular number.

* * * * *